Dec. 13, 1960 J. BOSCH 2,964,630
APPARATUS FOR CONTINUOUSLY MEASURING THE THICKNESS
OF TUBES DURING THE MANUFACTURE THEREOF
Filed Dec. 3, 1954
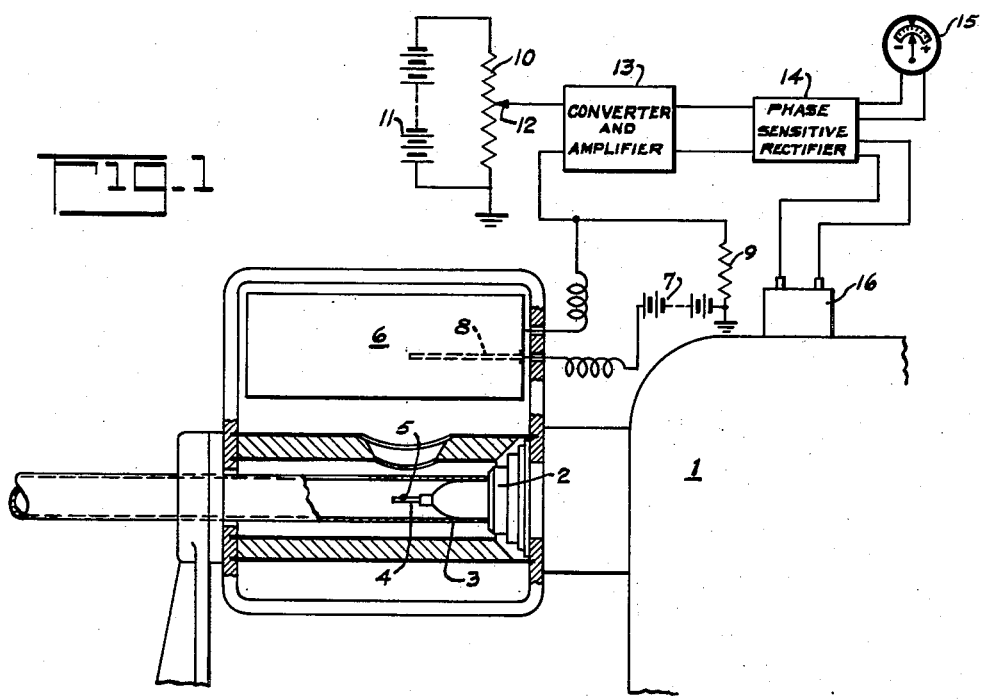
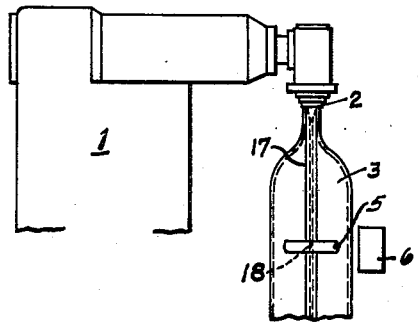
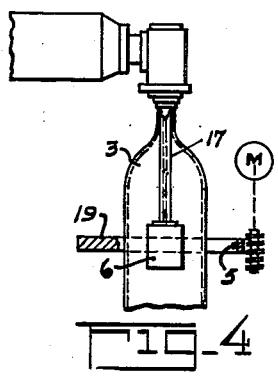
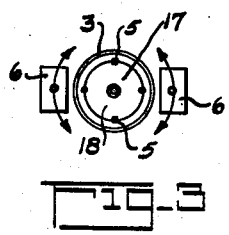
INVENTOR
JULIUS BOSCH
BY
his ATTORNEY United States Patent Office 2,964,630
Patented Dec. 13, 1960

2,964,630

APPARATUS FOR CONTINUOUSLY MEASURING THE THICKNESS OF TUBES DURING THE MANUFACTURE THEREOF

Julius Bosch, Erlangen-Bruck, Germany, assignor to Frieseke and Hoepfner, G.m.b.H., Erlangen-Bruck, Bavaria, Germany, a corporation of Germany Filed Dec. 3, 1954, Ser. No. 473,002

Claims priority, application Germany Dec. 4, 1953

4 Claims. (Cl. 250—83.3)

This invention relates to a system of measuring and controlling by continuous operation the wall thickness of tubular products during manufacture thereof. The invention is applicable, for example, to the precise measurement and control of plastic tubing while being extruded continuously from an extrusion machine.

According to the invention the tube wall thickness can be measured directly after the material leaves the die or very soon thereafter while it is still soft. Continuous measurement makes it possible to control and regulate the product, for instance by controlling the feed of the raw material or the speed of the extrusion screw or by any other suitable method. This is very advantageous and especially desirable when the wall thickness must be kept within certain tolerances, as for instance during the extrusion of a film in a circular die.

The film extruded in a circular die is usually produced by the following method: the very soft plastic material is forced through the die of the extrusion machine and has a relatively small diameter which is stretched to the desired diameter by internally acting forces. The desired wall thickness of the film produced by this method depends, inter alia, on the following variables:

(1) The amount of raw material fed in per unit time, i.e., the speed of the screw of the extrusion machine.
(2) The intensity of the expanding or stretching force.
(3) The speed of the winding machine that gathers the final product.

The distance between the exit die and the winding equipment is fairly large. That is, it has to be large enough so that the synthetic material which is soft at the beginning will be hardened by the time it arrives at the winding equipment.

Prior to the present invention it was not possible to measure continuously the wall thickness of the plastic material leaving the die, or to measure continuously the wall of the material after it had been stretched. The adjustment for pre-determined wall thicknesses, especially with stretched plastic materials, was always done solely by "cut and try" and experience, and because of this never was reliable.

Recently there has been developed a method to measure thickness of sheet material on a continuous basis in a continuous process without contacting the material. This method makes use of the absorption of rays emitted by a radio isotope while penetrating the material. It is necessary that the source of radiation, i.e., the radio isotope, be on one side of the material to be measured and an ionization chamber or a counter tube, or any other suitable detection device be on the other side.

It is obvious that the same method can be used to measure the wall thickness of the stretched synthetic tube when the tube is slit and pressed flat in sheet form on the winding equipment. However, this would not serve the purpose because the synthetic material is already hard and the distance between the measuring point and the point where efficient control and adjustment can be made is too large. The herein described invention provides an efficient and reliable method for measuring the wall thickness while the material is still in a plastic state, or at least where the distance between the die and the measuring point is very short. In this way it is possible to use the measuring equipment for automatic control; for instance it would be possible to control automatically the speed of the screw of the extrusion machine by using the control quantity obtained from the thickness measuring equipment for correcting variations in thickness. According to the present invention, thickness can be readily measured by positioning a radio isotope at the longitudinal axis of the die and/or the center of the stretched tube, so that the emitted un-absorbed rays can be detected by an ionization chamber or count tube which is positioned at a fixed distance from the outside of the synthetic tube.

According to the invention, where the wall thickness has to be measured immediately after the tubular material has left the die of the extrusion machine, a holder containing radioactive material such as a radio isotope is attached to the die and an ionization chamber or counter tube, or any other suitable detection device is positioned at pre-determined spaced relation at the outside of the tube.

It is also possible to measure the wall thickness further away from the die at the place that the material is stretched to a thin walled tube. In this case the source can be attached to a rod extending along the longitudinal axis of the tube. It is sometimes desirable to have the radioactive source disposed in a circular arrangement. Opposite the source as mentioned above, there will be one or more ionization chambers or counter tubes on the outside of the tube spaced around the circumference. If the tubular material is stretched by blowing a gas, such as air, into it by means of a blow pipe this pipe may be used for supporting the radioactive source.

The radiation may be, for example, the beta radiation of a suitable radio isotope (for instance Thallium 204). The beta radiation is mainly emitted normal to the die or blow pipe axis and penetrates the tube wall. The thicker the wall the more the radiation will be weakened by absorption. The radiation is measured on the outside of the tube with the usual radiation measuring methods. It may be advantageous to measure the wall thickness around the entire circumference of the tube and for this purpose several ionization chambers or counters or other detecting devices can be used. In many cases it may be more practical to use but one ionization chamber or counter and have this one circle the tube while the tube moves linearly forward. The measuring values obtained with the thickness measuring equipment may readily be used to control automatically by known control methods the thickness of the film by controlling the proper regulating mechanism according to the sense of the measuring values or control quantities.

The invention will be more fully set forth in the following description referring to the accompanying drawing and the features of novelty will be pointed out with particularity in the claims annexed to and forming a part of this specification.

Referring to the drawings which show several examples of how this invention may be used, Fig. 1 shows schematically an application of wall thickness measurement of synthetic (plastic) tubes directly at the die of the extrusion machine where extrusion is in the horizontal direction;

Fig. 2 shows also schematically an application of wall thickness measurement to a stretched tube where air is blown into the tube to stretch it;

Fig. 3 shows also schematically a cross-section of the stretched tube using several detectors on the outside of the tube taken along the line III—III of Fig. 2; and Fig. 4 shows an alternative arrangement of the radiation source and detector.

The extruding machine 1 shown by way of example in Fig. 1 has a die 2 through which the synthetic (plastic) tube 3 leaves the extrusion machine. A mandrel 4 is positioned in the inside of the tube along the longitudinal axis of the die and a radiation source 5 is suitably attached to it. Opposite this radiation source on the outside of the tube a fixed distance therefrom is an ionization chamber 6, which of course can be replaced by any other suitable radiation detector. This radiation detector is connected electrically in a well-known manner to suitable indicating and control apparatus including an amplifier, etc. presently described.

As above indicated, the radiation passing through the tube wall is collected by the ionization chamber. A voltage source 7 maintains a difference of potential between the chamber center electrode 8 and the other electrode constituting the wall of the ionization chamber 6. The radiation entering the chamber causes an ionization current to flow through the resistor 9 of the circuit interconnecting the electrodes. For calibration purposes, a potentiometer or resistor 10 is kept at a constant voltage by the constant current source 11. Part of the voltage, determined by adjustment of contact 12, developed across resistor 10 representing the desired wall thickness of the tube to be measured, is brought to the input of suitable means such as converter and amplifier equipment 13. The voltage developed across resistor 9 is also brought to the input of the converter and amplifier apparatus 13. The difference voltage between the voltage across resistor 9 and the derived voltage from potentiometer 10 is converted to A.C. and amplified by the apparatus 13. The resulting output voltage which varies in phase according to the sense of the difference voltage, is fed to a phase-sensitive rectifier 14 for producing either positive or negative D.C. control voltages, according to the sense of the variation in wall thickness. These D.C. control quantities can readily be used for indicating, recording or controlling purposes, such as for example by controlling a thickness varation indicator 15 and/or a polarized relay 16 for controlling the feed of the extrusion machine.

In Figs. 2 and 3 which illustrate extrusion along the vertical axis, the tube 3 has already been stretched by an expansive force acting from the inside on the walls of the tube for increasing its diameter. A hollow blow rod 17 is positioned in the inside of the stretched tube through which air is forced into the plastic tube. This rod has attached at its end a circular arrangement 18 of radioactive materials.

Instead of using one radiation detector as in Fig. 1 several radiation detectors are spaced around the circumference of the tube. It is advantageous to measure as many points as possible during a continuous process, and if desired a radiation detector can be arranged to rotate continuously around the tube by providing current collecting means for the electrical connections; or a radiation detector can be arranged to oscillate through a predetermined arc about the tube.

According to an example of the invention above described a radioactive source is positioned at the inside of the tube for the purpose of continuously measuring wall thickness of tubular or hose products. A detector such as an ionization chamber is attached at the outside of the tubular product. The detector necessarily has suitable electrical connections. If it is sufficient to measure wall thickness at one particular point only the detector can be rigidly attached. If the wall thickness has to be measured continuously about the entire circumference of the tubular product, a rotating detector may be used which rotates around the tube. However, since the radiation detector has electrical connections it is sometimes difficult to have it rotate around the tube, and in some cases only an oscillatory movement is possible. This has the disadvantage that complicated rotating or oscillating equipment is needed.

In the example shown by Fig. 4, a radiation detector, such as for instance an ionization chamber 6, can be located in fixed relation at the inside of the tube and the radioactive radiation source 5, which does not involve electrical connections, can rotate about the outside of the tube. This is advantageous since the entire circumference of the tubular product can be measured continuously along a helical path as the tube is extended. The rotating equipment here involved is simple as no equipment of material weight has to be rotated.

In the example shown the detector 6 is attached in centered relation to the blow tube 17 through which the electrical connections can be led. The radiation source 5 is carried at the inner periphery of a ring gear 19 that may be suitably rotated and positioned at different points around the outside of the tube by means of a motor M or the like controlled as required.

It should be understood that this invention is not limited to specific details of construction and arrangement thereof herein illustrated, and that changes and modifications may occur to one skilled in the art without departing from the spirit of the invention.

What is claimed is:

1. Apparatus for measuring the wall thickness of a tubing consisting of an organic material such as a plastic or the like, extruded continuously from the die of an extrusion machine, comprising a radioactive element for emitting radiation of the beta type and an associated radiation detecting element, means extending from the die into the interior of said tube coincident with the longitudinal axis thereof for supporting one of said elements in predetermined relation to the longitudinal axis of the tubing, the other element being located in predetermined space relation to said longitudinal axis at the outer side of the tubing and mounted for continuous concentric movement with respect to said axis, and means responsive to said detecting element for measuring the intensity of radiation penetrating the tubing and received by the detector so as substantially continuously to determine the peripheral wall thickness along a substantially helical path of the longitudinally moving tubing.

2. Apparatus as specified in claim 1 wherein the die-supported element consists of a radioactive isotope relatively fixed with respect to the longitudinally moving tubing, and the detecting element is mounted for concentric movement exteriorly of the tubing.

3. Apparatus as specified in claim 1 wherein the radiation detecting element is mounted within the tubing in fixed relation to the extruding die, and the radioactive element is mounted exteriorly of the tubing for concentric movement with respect thereto.

4. Apparatus as specified in claim 1 wherein the extrusion die is associated with means for directing gas under pressure into the tubing for expanding it as it comes from the extrusion die, and the element within the tubing is located in the expanded part of the tubing.

References Cited in the file of this patent

UNITED STATES PATENTS

| | | |
|---|---|---|
| 2,264,725 | Shoupp et al. | Dec. 2, 1941 |
| 2,340,923 | Boucher | Feb. 8, 1944 |
| 2,528,724 | Herzog | Nov. 7, 1950 |
| 2,540,146 | Stober | Feb. 6, 1951 |
| 2,702,864 | McKee | Feb. 22, 1955 |
| 2,735,944 | Greer | Feb. 21, 1956 |
| 2,748,290 | Reichertz | May 29, 1956 |
| 2,814,071 | Allan | Nov. 26, 1957 |

OTHER REFERENCES

Radioisotopes in Industry, by G. R. Bradford, published by Reinhold Publishing Co., New York, N.Y., copyright 1953, pages 15 and 16.